Dec. 8, 1953          J. BELL          2,661,959
TWO-WHEELED CHILD'S CARRIAGE
Filed Nov. 19, 1948          3 Sheets-Sheet 1
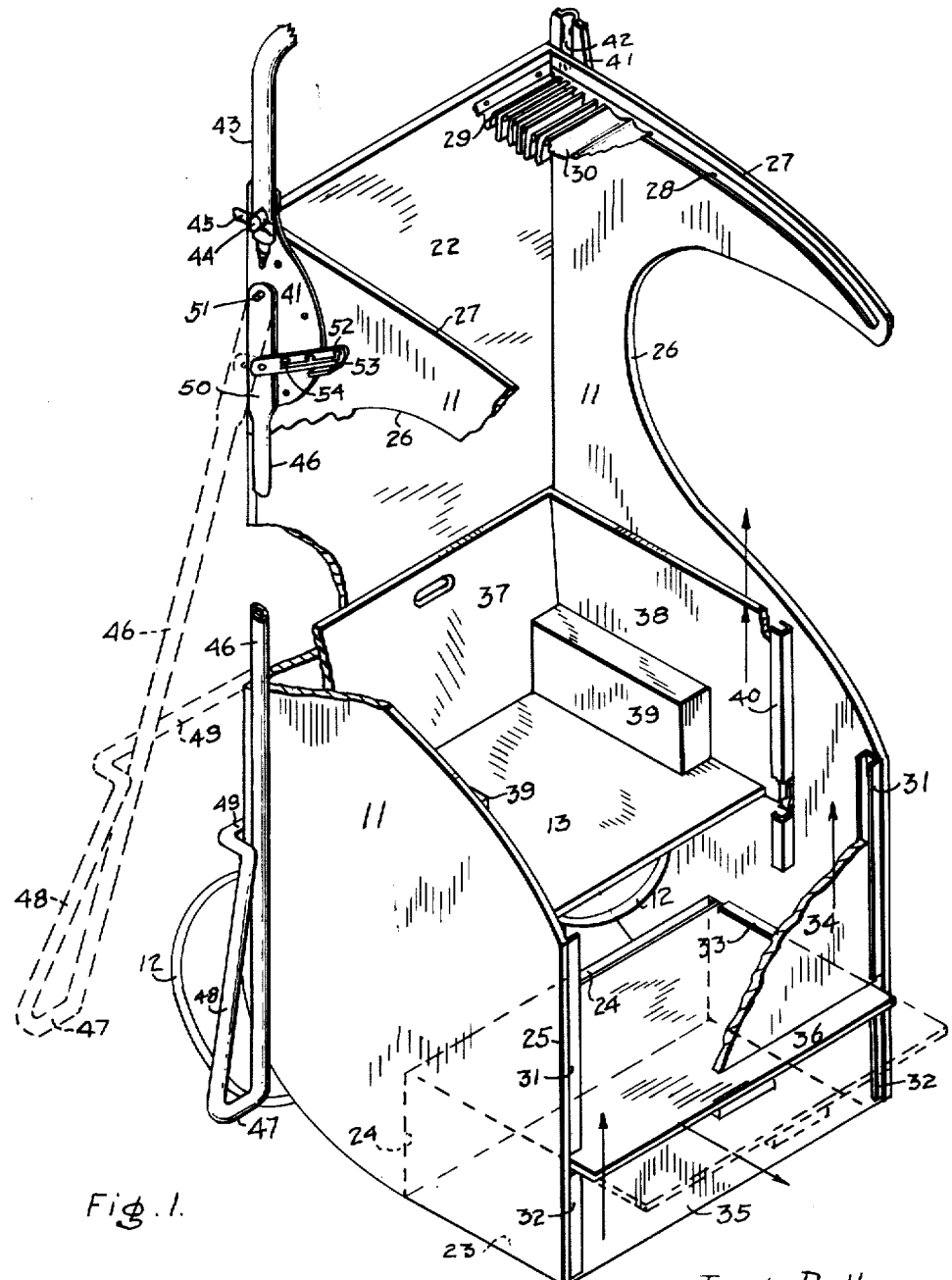
Fig. 1.
Jessie Bell
INVENTOR
BY 
ATTORNEY

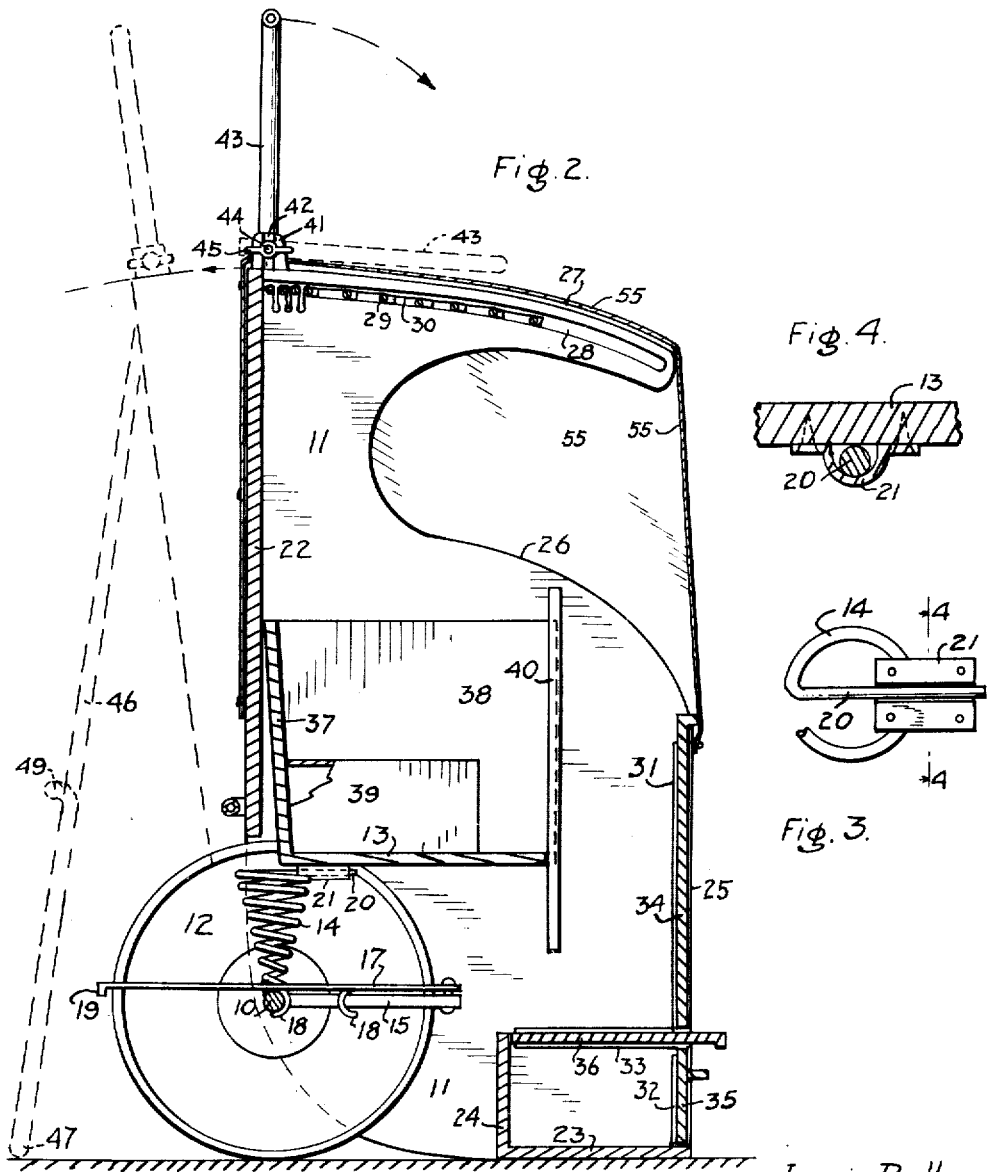

Dec. 8, 1953  J. BELL  2,661,959
TWO-WHEELED CHILD'S CARRIAGE
Filed Nov. 19, 1948  3 Sheets-Sheet 3
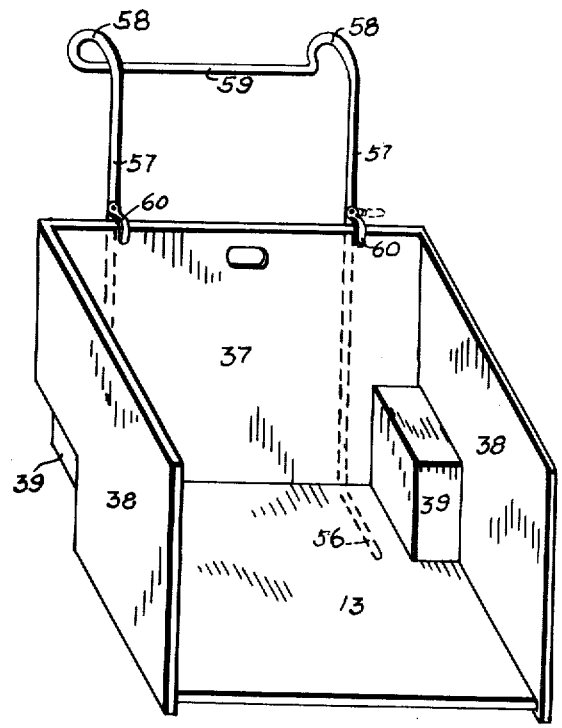
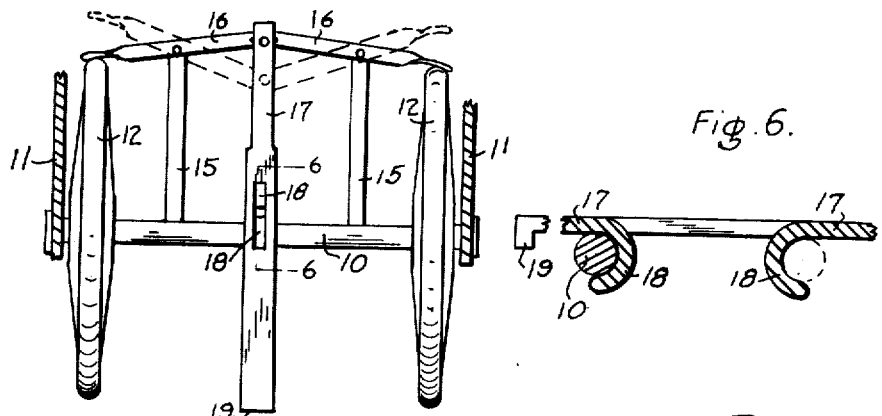
Jessie Bell
INVENTOR
BY
ATTORNEY Patented Dec. 8, 1953

2,661,959

UNITED STATES PATENT OFFICE 2,661,959

TWO-WHEELED CHILD'S CARRIAGE

Jessie Bell, Tacoma, Wash.

Application November 19, 1948, Serial No. 60,863

1 Claim. (Cl. 280—47.25)

This invention relates to vehicles adapted for use in the care of children and especially to such vehicles as are mounted on two wheels and are propelled by pushing.

This vehicle is designed to be constructed almost entirely of plywood and has very little metal incorporated therein. It is provided with two wheels for transportation and when so transported is tipped slightly rearward, while if left standing is provided with a substantial base and cannot be accidentally overturned. It is provided with adjustable props so that it may be left in a rearward inclined position, if desired The child's seat is spring supported within the vehicle and may be readily removed therefrom and hung from the back of a seat in an automobile, without removing the child therefrom.

The objects of my invention are to provide a low cost and easily constructed vehicle for the care of the young child, in which the seat is spring supported and may be readily removed from the vehicle; which is provided with a removable front board to prevent the child from falling out of the vehicle; in which the foot board is removable to accommodate older children; which is provided with an adjustable sunshade; in which the handle may be folded down when the vehicle is not in use; and which may be propped in inclined position when not in use.

I attain these and other objects by the devices, mechanisms and arrangements illustrated in the accompanying drawings, in which:

Fig. 1 is a perspective view of my improved vehicle, with parts broken away to reveal its construction, showing the vehicle standing on its base in upright position, and showing in dotted lines the position of the prop when extended rearward; Fig. 2 is a vertical section thereof and showing, in dotted lines, the position of the handle when stowed, and the position of the vehicle when propped in inclined position; Fig. 3 is a plan view of one of the two supporting springs for the seat; and Fig. 4 is a section taken on the line 4—4 in Fig. 3; Fig. 5 is a plan view of the chassis of the vehicle, showing the brake mechanism; Fig. 6 is a section of a portion thereof taken on the line 6—6 in Fig. 5; and Fig. 7 is a perspective view of the seat removed from the vehicle and mounted on the hanger adapted to support it from the back of a seat in an automobile.

Identical numerals of reference refer to the same parts illustrated in the several views.

Referring, first, to Figs. 1, 2 and 5, it will be seen that my improved child's vehicle is provided with a fixed axle 10, secured in the two side members 11 and extending across the rear of the vehicle. A pair of wheels 12 are rotatably mounted on the axle 10 on the inner sides of the side members 11, and the child's seat 13 is supported by means of two suitable spiral springs 14 mounted on the fixed axle 10. A suitable brake is also mounted on the axle 10 and consists of two brackets 15 (Fig. 5) extending forward from the axle 10 and having two brake arms 16 centrally pivoted thereto. The brake arms 16 extend outward from the brackets 15 to a position in front of the wheels 12 and are adapted to be moved into engagement therewith. The said brake arms 16 also extend inward towards the center of the vehicle and are loosely pivoted together and to the forward end of the central control bar 17. This bar 17 rests on the axle 10 and has a pair of lugs 18 extending downward therefrom (Fig. 6) to engage the said axle 10. When the bar 17 is pushed forward and the axle is in contact with its rearward lug 18, the brake arms 16 are firmly held in contact with the wheels 12 to prevent their rotation. The rearward end of the bar 17 is down-turned at 19 to form a handle.

The spiral springs 14 are suitably secured on the axle 10 and are provided with straight extensions 20 at their upper ends, said extensions 20 being removably secured to the bottom of the seat board 13 of the vehicle by suitable metal straps 21 (Figs. 3, 4).

The main body of the vehicle is composed of the two side members 11, a back member 22, a base member 23, and a vertical brace 24 (Fig. 2), said members 23 and 24 being at right angles to each other and in contact along their contiguous edges, to form two sides of a box. The brace 24 is positioned slightly to the rear of the front edge of the seat 13.

The side members 11, as seen in Figs. 1 and 2, extend from the level of the ground to a height sufficient to extend well above the height of a large child when seated in the vehicle, and from a point rearward of the axle 10 forward far enough to enclose the feet of the child when resting on the base board 23. The lower part 25 of the front edges of the sides 11 extends vertically at right angles to the base 23, but the upper part thereof is cut inward on a graceful curve 26 to enable the child to look out sideways. The top edges 27 of the members 11 extend from the back member 22 forward on a downward curve. The parts 11, 22, 23, and 24 are firmly secured together and are further braced by the fixed axle 10 secured to the said sides 11.

The parts 11 are provided with grooves 28, lying adjacent to and parallel with the top edges 27, and I mount a series of bars 29 therein, each extending across the vehicle between the said members 11. The bars 29 are also mounted in or secured to a flexible fabric cover 30 which may therefore be adjusted to any position over the child, to act as a shade, by simply sliding the bars 29 in the grooves 28. The ends of said bars 29 are bent at right angles to aid in keeping the bars in parallel positions.

A pair of vertical U-shaped guide pieces 31 and 32 are secured to each of the two side members 11, close to the vertical edges 25 thereof, alined one above the other, and a similar horizontal guide piece 33 extends inward therefrom, said guides 31 and 32 being separated by an open space opposite to the end of the guide 33. An upper front vertical board 34 extends across the front of the vehicle, being mounted in the two opposite upper guide members 31. Similarly a lower front board 35 is mounted between the two lower guides 32. A horizontal board 36 slides in and is supported by the horizontal guides 33 and extends between the lower and upper edges of the boards 34 and 35. The several boards 34, 35 and 36 are removable from the vehicle by simply sliding them in the respective guides. The board 36 is preferably positioned to function as a foot board when the vehicle is used for a small child, and at the same time to form a closure for the box formed by the members 11, 23, 24 and 35, in which articles may be stowed if desired. When a larger child is in the vehicle the board 36 is removed so that the base board 23 then becomes the foot board.

The seat comprises the horizontal board 13, an inclined back board 37 and two sides 38. The sides 38 are cut away over the wheels 12 and are boxed in by the boxes 39. The front edges of the sides 38 are vertical and lie in the guides 40 and are free to move vertically therein. The pair of guides 40 are secured to the inner side of the side members 11, and are similar to the guides 31, but are turned at right angles thereto so as to face the rear.

The upper edges of the back 37 of the seat engage the back member 22 of the vehicle. The straps 21 are secured to the lower side of the seat 13 and are provided with loops adapted to receive and removably hold the straight upper extensions 20 of the springs 14, so as to secure the seat to the supporting springs. When it is desired to remove the seat, it is only necessary to pull the wires 20 out of the straps 21 and lift up the seat, the sides 38 sliding in the vertical guides 40.

The upper rear corners of the vehicle are enclosed by metal plates 41, which extend slightly above the sides 11, said upper ends being provided with outward grooves 42. The vehicle handle 43 has its ends flattened and correspondingly formed to fit over the said grooves 42. The handle ends 43 are pivoted on the bolts 44 to the said plates 41, and thumb nuts 45 secure them in position. Normally the handle 43 extends upwardly parallel with the back member 22 of the vehicle, but by loosening the nuts 45, it may be swung down, as shown in dotted lines (Fig. 1).

Referring, now, to the prop to support the vehicle in its rearward inclined position. This prop consists of a metal tube bent to form the legs 46, with feet 47 at their lower ends, then upturned as at 48 and extending across the back of the vehicle at 49. The tube ends 50 are flattened and are pivoted at 51 to the plates 41, so that they can be swung rearward to form the props for the vehicle. The said props are held in the desired angle by means of links 52 which are pivotally secured to the said flattened ends 50 and which are provided with notched slots 53 in which a fixed pin 54 rides.

I provide a fabric rain shield 55 which fastens in front to the upper part of the upper front board 34 and passes upward therefrom over the upper edges of the sides 11 and around the sides of the vehicle, and is secured at the rear by strings secured to the edges thereof, or otherwise.

I also provide a hanger frame (Fig. 7) which consists of a metal tube bent to form two feet 56 at its ends, two legs 57, with curved hooks 58 and a cross bar 59. The feet 56 are adapted to slip into the above-described straps 21, the legs 57 lie against the back member 37 of the seat and are provided with a pair of pivoted cleats 60 which pass over the top edge of the seat back 37 and firmly hold the seat on to the hanger frame. The hooks 58 are adapted to pass over the back of a seat in an automobile.

It will be noted that the seat is positioned between the front board 23, on which the vehicle rests when in vertical position, and the portion of the wheels 12 in contact with the ground hence, when the vehicle is left unattended in its vertical position, there is no danger of the vehicle being overturned, either forwards or backwards, by the bouncing of the child on the spring-supported seat; nor is there danger of the vehicle falling backward when braced, since the pin 54 is in the closed slot 53 and therefore limits the extent of the spread of the prop 46. Nor can the child fall out of the vehicle because the front board 34 will bar its fall.

It is obvious that suitable cushions or pads may be provided, if desired, said pads being preferably removably secured on the seat 13 and back 37 by any suitable means, such as snap buttons, vacuum bulbs, or otherwise.

It is, of course, to be understood that many changes may be made in the details of my invention as above described to suit the demands of the public or the convenience of the manufacturer, without departing from the spirit of my invention as outlined in the appended claim.

Having described my invention, what I claim and desire to secure by Letters Patent, is:

A child's vehicle adapted to resiliently support a seat therein, said vehicle comprising a frame having a back and side members, the back member terminating at its lower end above the side members, a fixed axle secured between the side members adjacent the rearward edge thereof below the back member, wheels mounted upon the axle, springs secured at one end to the axle and extending upwardly therefrom below the back member to support the seat, and vertical guides on the side members spaced from the back member for confining the seat between the back member and the vertical guides for vertical movement within the frame.

JESSIE BELL.

References Cited in the file of this patent

UNITED STATES PATENTS

| Number | Name | Date |
| --- | --- | --- |
| 69,565 | Hughes | Oct. 8, 1867 |
| 592,177 | Stutsman | Oct. 19, 1897 |

(Other references on following page)

UNITED STATES PATENTS

| Number | Name | Date |
|---|---|---|
| 867,381 | Koelle | Oct. 1, 1907 |
| 1,051,656 | Whitaker | Jan. 28, 1913 |
| 1,104,335 | Williams | July 21, 1914 |
| 1,131,197 | Bennett | Mar. 9, 1915 |
| 1,146,347 | Parker | July 13, 1915 |
| 1,171,297 | Adams | Feb. 8, 1916 |
| 1,301,514 | Shaw | Apr. 22, 1919 |
| 1,302,343 | Farrer | Apr. 29, 1919 |
| 1,327,864 | Everingham | Jan. 13, 1920 |
| 1,680,794 | Lawler | Aug. 14, 1928 |
| 1,950,371 | Baier | Mar. 6, 1934 |
| 2,039,818 | McNabb | May 5, 1936 |
| 2,181,892 | Head | Dec. 5, 1939 |
| 2,269,968 | Baker | Jan. 13, 1942 |
| 2,353,325 | Troendle | July 11, 1944 |
| 2,393,020 | Brede | Jan. 15, 1946 |
| 2,428,088 | McEachern | Sept. 30, 1947 |
| 2,430,629 | Bigus, Jr. | Nov. 11, 1947 |
| 2,440,126 | Strott | Apr. 20, 1948 |
| 2,488,681 | Sohn | Nov. 22, 1949 |

FOREIGN PATENTS

| Number | Country | Date |
|---|---|---|
| 161 | Great Britain | Jan. 20, 1855 |